United States Patent

[11] 3,593,154

[72] Inventor David A. Blass
Elmwood Park, Ill.
[21] Appl. No. 794,518
[22] Filed Jan. 28, 1969
[45] Patented July 13, 1971
[73] Assignee Zenith Radio Corporation
Chicago, Ill.

[54] FREQUENCY-SELECTIVE COUPLING NETWORK FOR A TELEVISION TUNER
8 Claims, 5 Drawing Figs.

[52] U.S. Cl. 325/437, 325/388
[51] Int. Cl. H04b 1/26
[50] Field of Search 325/481, 379, 380, 381, 385, 386, 436

[56] References Cited
UNITED STATES PATENTS

| | | | |
|---|---|---|---|
| 2,026,075 | 12/1935 | Wheeler | 325/388 |
| 2,027,949 | 1/1936 | Yolles | 325/388 |
| 2,048,527 | 7/1936 | Wheeler | 325/388 |
| 2,711,477 | 6/1955 | Bussard | 325/388 X |

*Primary Examiner*—Robert L. Griffin
*Assistant Examiner*—R. S. Bell
*Attorneys*—Francis W. Crotty and James E. Tracy

ABSTRACT: Tuning to a desired television channel, while rejecting its image channel, is accomplished by a novel coupling network combining a frequency selector and an image rejection trap simultaneously tunable to different frequencies by means of a single common tuning element. By the adjustment of a variable air capacitor, shunt connected to the primary inductor of a transformer, the frequency selector may be tuned to maximize the response of the coupling network to a selected television channel. The image rejection trap is formed by the mutual inductance and capacity coupling between the primary inductor and a secondary inductor of the transformer. Variations of the air capacitor effect changes in the coefficient of capacitive coupling between the inductors, with the result that the trap tracks the frequency selector; namely, as the frequency selector is tuned to a different selected channel the trap is automatically tuned to that channel's image frequency to achieve image signal suppression.

Inventor
David A. Blass

By James E. Tracy
Attorney

Inventor
David A. Blass
By James E. Tracy
Attorney

FREQUENCY-SELECTIVE COUPLING NETWORK FOR A TELEVISION TUNER

BACKGROUND OF THE INVENTION

This invention pertains to a novel frequency-selective coupling network for translating a received television signal in the tuner of a television receiver. More particularly, it relates to a tunable network for selectively tuning a superheterodyne type tuner to a desired television channel and at the same time strongly attenuating its image channel to avoid the introduction of unwanted interference signal components in the tuner's output IF (or intermediate frequency) signal. The invention is especially useful in a UHF continuous tuner, and will be described in such an environment.

The tuner of a television receiver, whether of the monochrome or color variety, facilitates the selection of a desired television signal, conveyed in a particular television channel from the television signals of the several other channels that are usually available in a given location. Under the television transmission standards existing in the United States, each channel occupies a total bandwidth of 6 megahertz and a transmitted television signal of a television program includes two different RF (or radio frequency) carriers separated in the frequency spectrum by 4.5 megahertz. The lower frequency carrier is amplitude modulated by the picture or video information of the televised program, while the higher frequency RF carrier is frequency modulated by the sound or audio information. If the program is transmitted in color, the picture RF carrier is amplitude modulated by the brightness or luminance information and also by a 3.58 megahertz subcarrier which has been previously phase and amplitude modulated by the color or chrominance information.

The tuner customarily includes (1) a tunable RF input stage connected to the receiver's antenna and having at least one frequency selector or resonant circuit to be tuned to the desired television channel, (2) a variable frequency local oscillator having a tunable frequency-determining circuit, and (3) a mixer whose output circuit is frequency selective. When the tuner is properly adjusted to receive a given channel, each of the tunable frequency selectors of the RF input stage is tuned to resonate at a frequency approximately midway between the two RF carriers of that channel, whereas the frequency-determining circuit of the oscillator is adjusted to resonate at a frequency higher than that midfrequency by a fixed amount which will be the same no matter which television channel is selected.

In accordance with the superheterodyne technique, the two received RF carriers of the selected channel are beat or heterodyned in the mixer with the local oscillator signal to produce in the mixer's output circuit, which provides the output of the tuner, an intermediate frequency signal (constituting the difference between the oscillator and television signals) which includes an amplitude-modulated picture IF carrier and a frequency-modulated sound IF carrier having a frequency separation of 4.5 megahertz from one another. For color transmission, the IF signal also includes a phase and amplitude modulated color IF carrier spaced from the picture IF carrier by 3.58 megahertz. The precise frequencies of the IF carriers are determined by the operating frequency of the local oscillator. Consistent with present industry practice, when the tuner is properly tuned to receive a television signal the oscillator will be operating at a frequency appropriately higher than the received RF carriers to establish the sound IF carrier at 41.25 megahertz and the picture IF carrier at 45.75 megahertz. The color IF carrier (if there is one) will be located at 42.17 megahertz.

Inasmuch as the halfway frequency between the sound and picture IF carriers is 43.5 megahertz, the IF carriers may be made to fall at the required frequencies with an oscillator frequency 43.5 megahertz higher than the center frequency of the received picture and sound RF carriers. Viewed differently, the required frequencies for the IF carriers may be obtained by having the oscillator operate at a frequency 45.75 megahertz above the picture RF carrier. For convenience, 43.5 megahertz may be referred to as the intermediate frequency of the receiver. The response or band-pass of the mixer's output circuit must, however, be sufficiently broad to accept the entire band of frequencies covered by the IF carriers and their modulation components.

Since the intermediate frequency signal is a difference signal, having been developed by essentially subtracting the received television signal from the higher frequency oscillator signal, there is a possibility that the television signal of another channel (if received at the tuner's input with sufficient strength) will heterodyne with the oscillator signal and produce in the tuner's output another, but unwanted, difference of IF signal covering a range of frequencies which overlaps the band-pass of the desired IF signal and thus interferes therewith. To explain further, when the superheterodyne principle is practiced with the local oscillator operating at a frequency greater than that of the selected television channel, a television signal conveyed over a channel having a center frequency that is higher than the oscillator frequency by an amount relatively close to the intermediate frequency will, if strong enough to be translated through the tuner's input stage, be converted by the mixer into an undesired IF signal superimposed on and distorting the desired IF signal. Such an undesired channel is called the image of the selected channel as it lies in the frequency spectrum on the side of the oscillator frequency opposite to that of the selected channel and with a spacing from the oscillator frequency approximately equal to that of the selected channel. The center frequency of the image channel is therefore displaced above that of the selected channel by roughly twice the intermediate frequency.

By way of example, UHF Channel 32 is considered the image of UHF Channel 17 and, in the absence of image signal attenuation, a television receiver located in a geographical area where both channels are in use and can be picked up by the receiver's antenna will experience image signal interference from Channel 32 when the receiver is tuned to receive Channel 17. This is made most clear by considering the specific frequencies of the RF carriers of the two related channels. Under United States standards, the picture RF carrier of Channel 17 has a frequency of 489.25 megahertz and the sound RF carrier is established at 493.75 megahertz. As mentioned, the sound and picture RF carriers may be converted to their counterpart IF carriers, having frequencies of 41.25 and 45.75 megahertz respectively, by operating the oscillator at a frequency 45.75 megahertz greater than that of the picture RF carrier. Therefore, for Channel 17 reception the oscillator will oscillate at 489.25+45.75 or 535 megahertz. Channel 32, on the other hand, has picture and sound RF carriers of 579.25 and 583.75 megahertz respectively. When they are beat with the 535 megahertz oscillator signal an undesired IF signal will manifest in the receiver. Specifically, Channel 32's picture RF carrier will be converted to an IF carrier of 579.25−535 or 44.25 megahertz while its sound RF carrier will be converted to 48.75 megahertz. Modulation components, particularly the picture components, of the undesired IF signal thus fall well within the IF band-pass, resulting in distortion and picture degradation during Channel 17 reception. Note that although the center frequencies 491.50 and 581.50 megahertz of Channels 17 and 32 respectively are separated by 90 megahertz, whereas twice the intermediate frequency (i.e. 43.5 megahertz) is only 87 megahertz, image interference nevertheless occurs due to the relatively broad bandwidths of the signals involved.

Image signal attenuation filters of various circuit configurations have been incorporated in television tuners in the past to avoid such interference. Most of the previously developed filter networks, however, are relatively complex and expensive, difficult to construct and adjust, and do not track properly. Applicant has devised a unique image rejection filter having none of these disadvantages. It employs substantially fewer elements than prior filters and represents a significant cost savings thereover.

Accordingly, it is an object of the invention to provide a new and improved image rejection filter for a television tuner.

It is another object to provide a novel signal-translating filter network for simultaneously selecting the television signal of a desired channel and rejecting the television signal conveyed over the image of the selected channel.

An additional goal is to provide a novel frequency-selective coupling network for the input stage of a television tuner.

SUMMARY OF THE INVENTION

The coupling network of the invention is to be incorporated in a television tuner of the superheterodyne type in which a television signal, received over a selected television channel, is converted into a desired intermediate frequency signal, and in which a television signal, received over the image of the selected channel is subject to being converted into an undesired intermediate frequency signal. In accordance with one aspect of the invention, the coupling network comprises a tunable frequency selector, which includes the primary inductor of a transformer and a shunt-connected variable air capacitor, tunable by adjustment of the capacitor to resonate at any selected one of a plurality of television channels to maximize the response of the coupling network to the selected channel. A load circuit is coupled to a secondary inductor of the transformer. There is a tunable image rejection trap including the mutual inductance of, and the mutual capacity coupling between, the primary and secondary inductors. The coefficient of capacitive coupling between the inductors effectively varies inversely in response to variations of the air capacitor to tune the trap to the image frequency of the selected channel to effect image signal attenuation.

DESCRIPTION OF THE DRAWINGS

The features of the invention which are believed to be novel are set forth with particularity in the appended claims. The invention, together with further objects and advantages thereof, may best be understood, however, by reference to the following description in conjunction with the accompanying drawings in which like reference numbers identify like elements, and in which:

DESCRIPTION OF THE ILLUSTRATED EMBODIMENT

Figure 1:
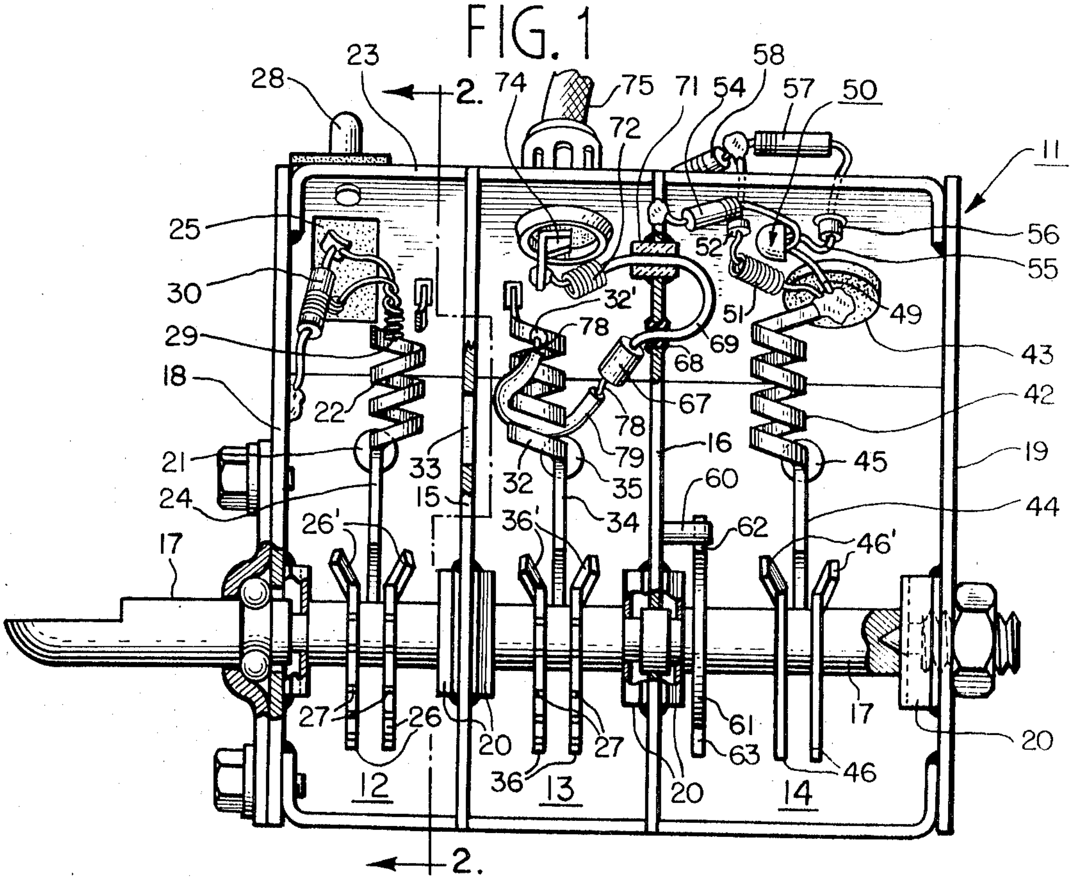
FIG. 1 is a sectional view of a UHF continuous tuner including a frequency-selective coupling network constructed in accordance with the invention.
Figure 2:
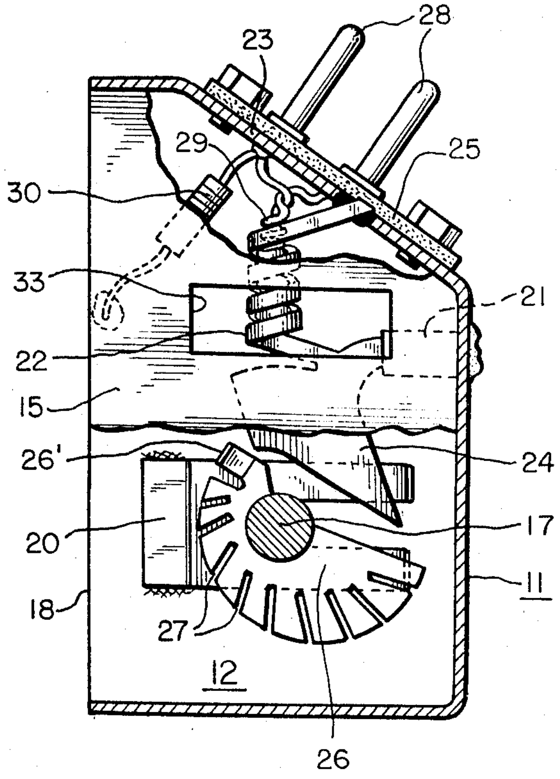
FIG. 2 is a sectional view taken along section line 2–2 in FIG. 1.
Figure 3:
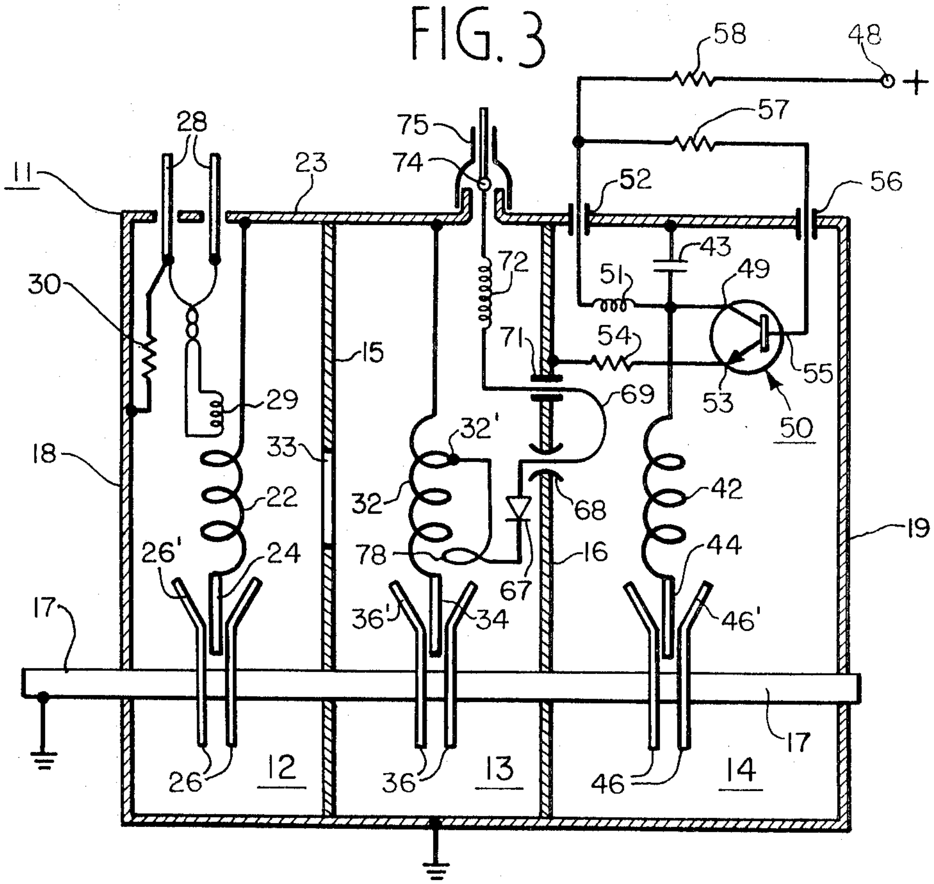
FIG. 3 is a schematic diagram of the illustrated UHF tuner.

Referring now to FIGS. 1—3, the UHF tuner shown therein is of the continuously adjustable type and comprises a metal housing 11 which encloses three separate compartments or chambers 12, 13 and 14. Briefly, compartments 12 and 13, separated by a wall 15, include and form part of first and second tunable RF frequency selectors, respectively, coupled in cascade. Compartment 14, shielded from chamber 13 by a wall 16, contains and constitutes part of a local oscillator stage having a tunable frequency-determining circuit for varying the oscillator's operating frequency. Compartment 13 also encloses a mixer stage. The outputs of the second frequency selector and the oscillator are coupled to the mixer, the output of which constitutes the tuner's output.

More particularly, simultaneous tuning of the two RF frequency selectors and the tunable circuit of the oscillator is facilitated by a control shaft 17 which extends through all three compartments and is rotatably mounted to the end walls 18, 19 by means of suitable bearing structures. Shaft 17 is electrically connected to the end walls and to compartment walls 15 and 16 by a series of grounding leaves 20 each of which has one end soldered to a housing or compartment wall and an intermediate portion seated within an undercut portion of shaft 17, as seen in FIG. 2. The first tunable frequency selector comprises an inductor 22, in the form of a coil having a plurality of winding turns, having an electrical length which approaches one-quarter of a wavelength at a high frequency end of the UHF band. One terminal of inductor 22 is conductively secured to the top wall 23 of housing 11 while the other end terminates in a planar extension 24 supported by a post 21 of insulating material, see especially FIG. 2. In this fashion, inductance coil 22 constitutes the inner conductor of a coaxial transmission line while the housing and bordering walls form the outer conductor.

Extension 24 serves as the stationary or stator plate of a variable air capacitor which also includes a pair of spaced rotor plates 26 soldered, staked or otherwise conductively affixed to control shaft 17 for rotational displacement, in a plane parallel to stator plate 24, from a position overlapping and embracing the stator plate to a position remote therefrom. The latter position is illustrated in FIG. 2. Plates 26 are of identical arcuate configuration and each includes an adjustable tab 26′, preferably struck or formed along one edge of the plate itself. Tabs 26′ together with plate 24 serve to establish the principal tuning capacitance for the frequency selector at the high frequency end of the UHF band. Additionally, each of plates 26 has a plurality of canted knifing slots 27 to facilitate tuning of the selector so that it will track or follow the tuning of the other two tunable circuits included in the UHF tuner.

The selector of compartment 12 also has an antenna input circuit comprising a pair of UHF antenna terminals 28 mounted on a panel 25 of insulating material atop housing 11 and inductively coupled to inductor 22 via a coil 29. One of terminals 28 is returned to a plane of reference potential or ground, provided by housing 11, through a resistor 30 which provides a leakage path for any static charge accumulating on the antenna.

The second tunable frequency selector comprises an inductor 32 similar in length and configuration to inductor 22 and coupled thereto through a window 33 in wall 15. Inductor 32 also has one end grounded to top wall 23 of the housing and a free end formed into a planar extension 34 supported by an insulator post 35, thus permitting inductor 32 to serve as the inner conductor of a coaxial transmission line of which compartment walls 15 and 16 and housing 11 constitute the outer conductor. Extension 34 is of the same size and shape as extension 24 and is in alignment therewith as viewed along the axis of shaft 17. The frequency selector is tuned by and includes a variable air capacitor having inductor extension 34 as a stator plate and a pair of adjustable plates 36 which are supported on and electrically connected to shaft 17 in axial alignment with capacitor plates 26, and are furthermore displaceable over the same limits as plates 26. Rotor plates 36 may be identical to plates 26 even to the extent of having similar slots 27 and adjustable tabs 36′ which, together with stator plate 34, constitutes the principal tuning capacitance for the second frequency selector at the high end of the UHF band.

Rotor plates 26 and 36 are mounted symmetrically relative to the walls of their respective compartments. This permits a measure of control over stray capacitances by equalizing the effects of the strays between the capacitor plates and the compartment. On the other hand, inductors 22 and 32 are not symmetrically disposed relative to their compartments in that their center sections are offset relative to their respective extensions 24, 34. Although the inductors are substantially identical in length, inductor 32 constitutes, in effect, a mirror image of inductor 22 rather than being identical in configuration. In this fashion, their planar extensions 24, 34 remain centered in their respective compartments while the inductors assume positions which provide a desired magnitude of mutual inductive coupling commensurate with the smallest feasible opening for window 33.

Compartment 13 further includes a mixer stage the details of which will be considered later. Attention will first be addressed to the oscillator stage included in compartment 14.

The third tunable circuit of the UHF tuner provides the frequency-determining portion of the oscillator, and comprises an inductor 42 having an electrical length approaching a quarter wave length at the high end of the UHF band. The low impedance end of inductor 42 is coupled to wall 23 through a capacitor 43 while its opposite or high impedance end is formed into a planar extension 44 supported by a post 45 of insulating material and disposed in alignment with extension 24 and 34. Inductor 42 together with housing 11 and walls 16 and 19 constitute a capacity-tuned, coaxial transmission line. The tuning capacitor for the oscillator stage comprises inductor extension 44 as a stator plate and a pair of adjustable rotor plates 46 conductively secured to shaft 17 in alignment with rotor plates 26 and 36 for displacement in the same manner as those rotor plates. Plates 46 do not have the canted knifing slots found in plates 26 and 36. Each plate 46 does have, however, a single tuning slot (not shown) which is located outside that area of the plate which confronts stator plate 44 and is disposed normal to its straight edge. In other respects, plates 46 are identical to plates 26 and 36 and, in like fashion, include adjustable tab portions 46' which cooperate with stationary plate 44 to establish the tuning capacitance for the oscillator at the high frequency end of the UHF band.

Each of the tunable circuits of compartments 12 and 13 is to be tuned, by adjustment of its associated air capacitor, to resonate at a frequency approximately halfway between the two RF carriers of the selected television channel. Of course, the tuned circuits must be sufficiently broadly tuned to accept the RF carrier frequencies and their modulation components. In accordance with industry practice, for optimum tuning the local oscillator should oscillate at a frequency 43.5 megahertz greater than that to which the first and second frequency selectors are tuned. Thus, the frequency-determining circuit of the oscillator must include some reactance, in addition to coil 42 and air capacitor 44, 46, in order that its resonant frequency will be appropriately higher than that of the two frequency selectors. This is accomplished by capacitor 43 disposed in series relation with capacitor 44, 46 thereby reducing the total capacitance of the oscillator's tunable circuit to permit tuning to a higher frequency.

The junction of inductor 42 and capacitor 43 is directly connected to the collector 49 of a grounded-base NPN transistor 50, see especially FIG. 3. By employing a low-impedance oscillating device, such as a transistor, a quarter-wave line or inductor is feasible. Collector 49 is connected to a source of positive DC operating potential 48 via a decoupling choke 51, a feed-through capacitor 52 mounted in top wall 23, and a voltage dropping resistor 58. The emitter 53 of transistor 50 is returned to ground or housing 11 through a current-limiting bias resistor 54 which also functions to isolate the emitter from RF energy. The base 55 is connected to positive potential source 48 by way of a feed-through capacitor 56, a resistor 57 and resistor 58. The circuit arrangement is that of a conventional grounded-base oscillator.

Located within the oscillator compartment 14 is a range or limit control comprising a post 60 anchored to wall 16 and a stop 61 affixed to shaft 17 and including a pair of abutments 62, 63 cooperating with post 60 to confine the rotation of shaft 17 to an angular displacement of approximately 200°, the travel required by the three air capacitors to tune their associated tunable circuits to achieve tuning across the entire UHF band.

Consideration will now be given to the mixer stage and its couplings to the oscillator and to the second frequency selector. The stage includes a mixer diode 67 having its anode lead connected through a rubber grommet 68, mounted in wall 16, to one terminal of a coupling loop 69 located in compartment 14. Its other terminal is connected through the center lead of a feed-through capacitor 71, mounted in wall 16, and an IF output coil 72 to the center terminal of an IF output jack 74, in turn coupled to a television receiver (not shown) via a coaxial cable 75.

The image rejection filter of the invention is incorporated in the circuitry coupled to the cathode terminal of diode 67. More specifically a tap 32', on the winding turn of inductor 32 closest to its low impedance end, is connected through a conductor 78 to the cathode of diode 67. A sleeve 79 of insulating material encompasses conductor 78 to prevent it from contacting any other portion of inductor 32, since preferably the inductor is not insulated. As seen in FIG. 1, wire 78 is formed so that a portion thereof provides a coupling loop and lies or is sandwiched between the two adjacent winding turns of inductor 32 closest to its high impedance end. By dressing conductor 78 in that specific way, mutual inductance will exist between it and inductor 32. Those two elements will consequently constitute a transformer, inductor 32 being the primary while conductor 78 forms the secondary inductor. This circuit arrangement is clearly seen in FIG. 3. Due to the close proximity between the primary and secondary inductors, mutual capacity coupling or distributed capacitance will also be present therebetween. As will be explained, the mutual inductance and mutual capacity coupling between inductors 32 and 78 provide an image rejection trap that automatically tunes to and suppresses the selected channel's image regardless of the channel selected.

Since the secondary inductor 78 is connected to tap 32', inductor 32 in addition to constituting the primary with respect to secondary 78 also functions as an autotransformer. Autotransformer coupling is utilized for impedance matching purposes and so that the RF signal will be supplied to the mixer at an appropriate amplitude.

The operation of the described UHF tuner will initially be considered without regard to the presence of inductor 78. Tuning to a desired UHF channel is achieved by rotating control shaft 17 until the first and second frequency selectors are tuned to the center frequency of that channel, at which time the tunable frequency-determining circuit 42, 43, 44, 46 of the oscillator will be adjusted to cause the oscillator to produce a heterodyning signal of a frequency 43.5 megahertz higher than that to which the frequency selectors are tuned. Oscillator energy is coupled by loop 69 from the frequency-determining circuit to one side of mixer diode 67. At the same time, RF energy from frequency selector 32, 34, 36 is coupled to the other side of diode 67. The mixer beats or heterodynes the oscillator signal with the picture and sound RF carriers of the selected channel to produce in the output of the mixer the customary sum and difference frequency components. Coil 72 and capacitor 71 effect tuning of the mixer's output circuit so that only the difference components are selected for inclusion in the output IF signal. Consequently, the IF signal produced at output jack 74 contains sound and picture IF carriers at the required frequencies, namely 41.25 and 45.75 megahertz respectively. Again, the tuned output of the mixer must be sufficiently broadly tuned so that both of the IF carriers, as well as their modulation components, are delivered to jack 74.

Customarily, coaxial cable 75 is coupled to the VHF tuner of a television receiver in order that the IF signal produced by the UHF tuner may be amplified before it is delivered to the receiver's IF amplifying system. During UHF operation, the VHF tuner is converted to a pair of IF amplifying stages.

Figures 4, 5:
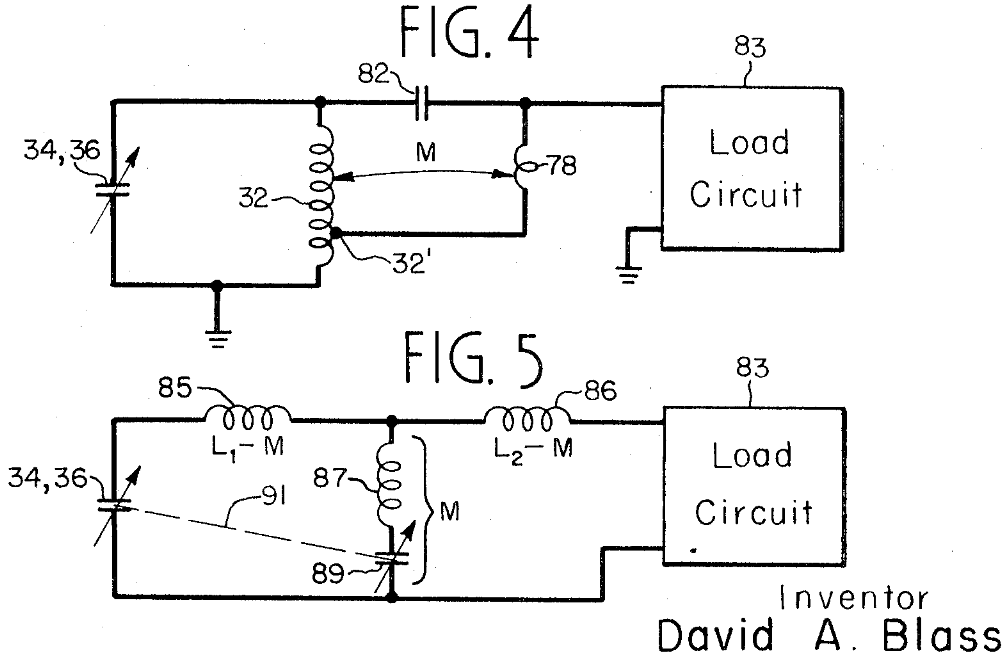
FIG. 4 illustrates, in equivalent circuit form, the coupling network portion of the schematic of FIG. 3; and, FIG. 5 shows an equivalent circuit of that of FIG. 4 and is helpful in explaining the operation of the invention.

The manner in which image signal attenuation is obtained in accordance with the invention will now be explained. The equivalent circuit for the coupling network comprising frequency selector 32, 34, 36 secondary inductor 78 and the load circuitry to which that inductor is coupled is schematically shown in FIG. 4 by means of lumped components. Since the low impedance end of inductor 32 and rotor capacitor plates 36 are all connected to the ground plane provided by housing 11, it is apparent that the primary inductor 32, of the transformer formed by inductors 32 and 78, is shunt connected to variable air capacitor 34, 36. The mutual capacity coupling or distributed capacitance between primary inductor 32 and secondary inductor 78 of the transformer is schematically shown by a capacitor 82. The mutual inductance of the inductors is illustrated in FIG. 4 in conventional fashion. The load circuit, which includes mixer diode 67, to which secondary inductor 78 connects is shown merely by the block 83 entitled "Load Circuit."

With the frequency-selective coupling network of the invention, tuning of frequency selector 32, 34, 36 to a selected UHF channel maximizes the response of the coupling network to that channel. At the same time, it has been found that a portion of the coupling network constitutes an image rejection trap since the network has essentially zero or insignificant response to the image channel of the selected channel. In other words, maximum attenuation is introduced at the image frequency so that signals around that frequency cannot reach the mixer diode and heterodyne with the oscillator signal, and thereby produce an undesired IF signal in the mixer's output. The trap or rejection frequency will always be approximately equal to the center frequency of the image channel no matter which of the UHF channels is selected by frequency selector 32, 34, 36. The rejection frequency thus tracks or leads that to which the selector is tuned by a constant frequency spacing roughly equal to 2×43.5 or 87 megahertz.

It is believed that the simultaneous tuning of the selector and of the rejection trap to different respective frequencies, but always with the same separation, is attributable to the fact that the coefficient of capacitive coupling between inductors 32 and 78 varies inversely in response to variations of air capacitor 34, 36. This may most easily be understood by considering the two extreme positions of that capacitor. At the lower frequency end of the UHF band capacitor 34, 36 exhibits its maximum capacitance and thus its minimum impedance. On the other hand, at the high end of the band the air capacitor will have minimum capacitance and consequently maximum impedance. The current flowing through coil 32 essentially divides between the two paths provided by air capacitor 34, 36 and mutual capacity 82. Due to the fact that the impedance presented by the air capacitor increases as the frequency selector is tuned toward the high end of the band, the current flowing through capacity 82 likewise increases. Hence, the coefficient of capacitive coupling between inductors 32 and 78 increases as the frequency selector is tuned to a higher channel. This means that the mutual coupling capacitance effectively varies and such variations effect tuning of the image rejection trap to the selected channel's image as is made clear by referring to FIG. 4's equivalent circuit shown in FIG. 5.

The transformer 32, 78 is convertible to the network shown by coils 85, 86 and 87 in FIG. 5. The value of coil 85 is approximately equal to the self-inductance of inductor 32 minus the mutual inductance existing between inductors 32 and 78. Coil 86 has a value equal to the self-inductance of inductor 78 less the mutual inductance of the transformer. Coil 87 represents the mutual inductance. Capacitor 89 represents the equivalent mutual capacity coupling and, since it is in the shunt branch of the network, its capacity will effectively decrease as the coefficient of capacitive coupling increases. Thus, the capacitance represented by capacitor 89 will decrease as the frequency selector is tuned to a higher UHF channel. The series combination of coil 87 and capacitor 89, which represents the elements making up the image rejection trap, will therefore series resonate at a higher frequency. Of course, at that resonant frequency the impedance of the shunt branch is zero as a consequence of which signals of and in the vicinity of that frequency will be suppressed and prevented from reaching the input of the load circuit. By proper selection of the parameters the rejection trap 87, 89 may be made to resonate at a frequency displaced from the resonant frequency of the frequency selector by the required amount (approximately 87 megahertz) for all settings of capacitor 34, 36. Since the effective capacitive coupling 89 varies directly in response to variations of capacitor 34, 36, a dashed construction line 91 is employed in FIG. 5 to indicate that the capacitances are effectively ganged.

Thus, a single common tuning element 34, 36 concurrently tunes the frequency selector to a desired channel and the image rejection trap to that channel's image. The network's response is maximized for the selected channel and at the same time is reduced to essentially zero for the image channel. By the employment of very little circuitry (in addition to that normally incorporated in a tuner), and at negligible cost, excellent image signal attenuation is achieved.

While applicant's unique image rejection filter is combined with the second frequency selector, it could instead be combined with first selector 22, 24, 26.

Certain features described in the present application are disclosed and claimed in copending application Ser. No. 343,281, filed Feb. 7, 1964 in the name of Wayne H. Reynolds, and assigned to the assignee of this invention. In fact, reference may be made to the Reynolds application for a more detailed description of many of the features of the illustrated UHF tuner.

While a particular embodiment of the invention has been shown and described, it will be obvious to those skilled in the art that changes and modifications may be made without departing from the invention in its broader aspects, and therefore, it is intended in the appended claims to cover all such modifications and changes as may fall within the true spirit and scope of the invention.

I claim:

1. A frequency-selective coupling network for use in a superheterodyne television tuner for selecting a predetermined television channel for conversion into a desired intermediate frequency signal and for rejecting the image channel of said predetermined channel displaced in frequency above said predetermined channel, said coupling network comprising:

a tunable frequency selector comprising a first inductor and a second inductor disposed adjacent thereto and establishing a mutual inductance therebetween for translating a component of signal energy at the frequency of said predetermined selected channel and for translating a component of signal energy at the frequency of said image channel, said first and second inductors further establishing a relatively fixed capacitance therebetween for effecting a capacitive coupling between said inductors for translating a component of signal energy at the frequency of said predetermined channel and also for translating a component of signal energy at the frequency of said image channel, an adjustable tuning capacitor shunted across said first inductor for resonating said first inductor to maximize the response of said coupling network to said predetermined channel, one terminal of said tuning capacitor and one terminal of said first inductor establishing a common terminal;

a tunable image channel rejection trap comprised of said second inductor and said coupling capacitance effectively arranged in series and coupled across at least a portion of said first inductor;

a load circuit comprising a heterodyning device coupled between the effective juncture of said second inductor and said coupling capacitance and said common terminal; and means for adjusting said tuning capacitor to permit said frequency selector to select any television channel within the range of said tuner while simultaneously varying the effective capacitance coupling between said inductors so that the resultant image frequency energy component appearing at the effective juncture of the second inductor and said coupling capacitance is minimized and substantially only signal energy at the frequency of said predetermined selected channel is applied to said heterodyning device.

2. A frequency-selective coupling network according to claim 1 in which said first inductor is a coil having a plurality of winding turns and in which at least a portion of said second inductor lies between adjacent ones of said winding turns.

3. A frequency-selective coupling network according to claim 2 in which said portion of said second inductor constitutes a coupling loop.

4. A frequency-selective coupling network according to claim 2 in which one extremity of said second inductor is connected to one of said winding turns, while the other extremity is connected to said heterodyning device.

5. A frequency-selective coupling network according to claim 1 in which said heterodyning device comprises a diode.

6. A frequency-selective coupling network according to claim 1 in which said tuner is a UHF tuner with said frequency selector and said image rejection trap are enclosed within a compartment, and in which said frequency selector is tunable to any channel in the UHF band.

7. A frequency-selective coupling network according to claim 1 in which said first inductor is a coil having a plurality of winding turns, wherein one terminal of said second inductor is coupled to one of said winding turns at one end of said first inductor, and in which a portion of said second inductor lies between adjacent ones of said winding turns at the other end of said first inductor.

8. A frequency-selective coupling network according to claim 1 in which said first inductor constitutes an autotransformer having a tap thereon connected to one extremity of said second inductor, and in which the other extremity of said second inductor is connected to said heterodyning device.